Jan. 12, 1954                A. L. A. FORTIER                2,665,579
                      PNEUMATIC CALIBRATING APPARATUS
                          Filed Feb. 14, 1950

INVENTOR
Andre L.A.Fortier.
BY
ATTORNEY

Patented Jan. 12, 1954

2,665,579

UNITED STATES PATENT OFFICE 2,665,579

PNEUMATIC CALIBRATING APPARATUS

André Louis Aimé Fortier, Clamart, France, assignor to Etavex, S. A., Geneva, Switzerland, a corporation of Switzerland Application February 14, 1950, Serial No. 144,077

Claims priority, application Switzerland February 22, 1949

2 Claims. (Cl. 73—37.5)

1

It is frequently necessary to calibrate parts having discontinuous surfaces such as channelled shafts, shafts provided with one or more keying grooves, grooved plane surfaces and so forth. For calibrating these parts during their machining, it is not possible to use mechanical feelers resting on the surface which is being machined as the feelers are damaged when passing over grooves. The calibration by means of a pneumatic apparatus in such a case enables the dimensions of a part to be measured without any member coming into contact with its surface. In fact, this apparatus is provided with feelers formed by an orifice supplied with compressed air and adapted to be located in immediate proximity to the surface which is being machined and of which the delivery, which is a function of the distance of the orifice from the surface which is being machined, is measured. However, in the case of discontinuous surfaces, such as those referred to above, the known types of pneumatic apparatus do not enable the calibration to be effected during machining as the passage of a groove in front of the measuring orifice induces operation of the apparatus which controls the stopping of the machining operation.

The present invention has for its object the provision of a pneumatic type of calibrating apparatus which can be used to calibrate such discontinuous surfaces. The invention, in general, comprises a body member housing two primary pneumatic ducts which are connected to a common source of compressed air and provided with calibrated inlet orifices. One of these ducts, regarded as the measuring duct, is provided with one or more fixed outlet orifices adjacent to which the object to be measured is normally placed. The other duct, regarded as the adjusting duct, has an adjustable outlet orifice. A pneumatic differential pressure indicating device has a pair of chambers separated by a flexible pressure sensitive diaphragm and each chamber is pneumatically connected to one of the ducts at a point between the inlet orifice and the outlet orifice of the duct. The pressure indicating devices include an electrical signal circuit containing an electrical switch which is operated to its open and closed positions by the movement of the diaphragm. A third pneumatic duct, regarded as the control duct, has a fixed outlet orifice for disposition adjacent the object to be measured. By these means pressure variations in the control and measuring ducts occur simultaneously. The electrical signalling system includes an electrical control switch having movable electrical contact elements. These control elements are moved in and out of contact relation by means pneumatically connected to the control duct and responsive to pneumatic pressure changes in the control duct.

Two forms of construction of the apparatus are shown diagrammatically and by way of example in the accompanying drawings, wherein.

Figure 1:
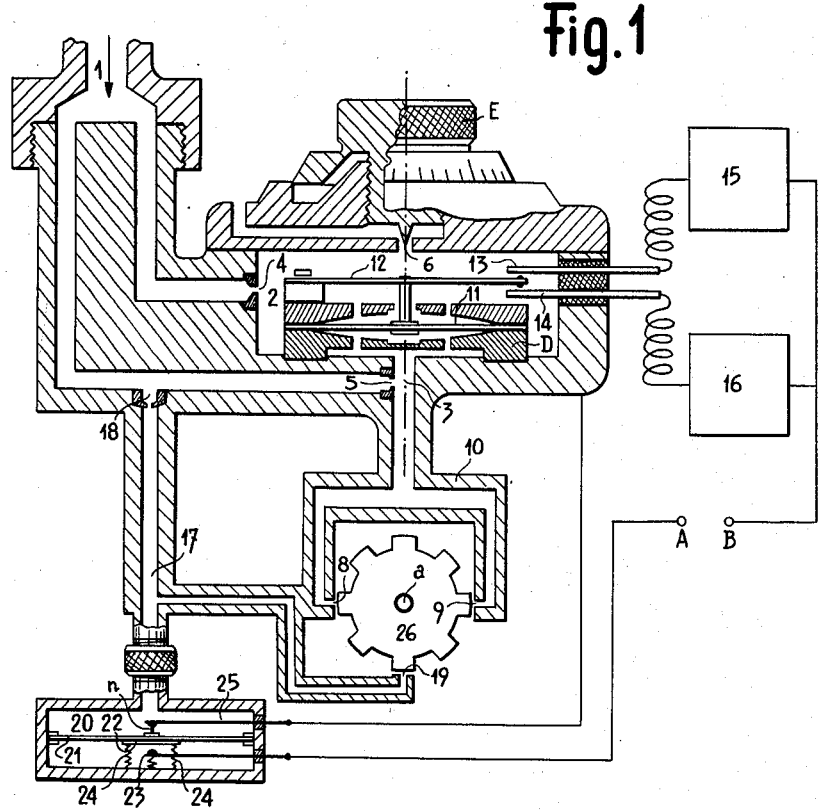
Fig. 1 is a view in section of a first form of construction.

The apparatus shown in Fig. 1 is similar to that described in copending application No. 772,105 filed September 4, 1947, now Patent No. 2,564,527 issued August 14, 1951, is provided with a pipe 1 connected to a source of compressed air, and supplying two chambers 2 and 3 by means of two primary ducts having jets 4 and 5. The chamber 2 is provided with an outlet orifice 6, of which the cross sectional passage is adjustable by means of an operating member E. The chamber 3 is provided with an outlet orifice formed by two openings 8 and 9 each provided at the end of one of the branches of a clamp 10. The chambers 2 and 3 are connected to a differential pressure indicator D provided with a measuring member separating the chambers 2 and 3 from one another and sensitive to the differences which may exist between the pressures in the chambers. The sensitive measuring member is formed by a deformable diaphragm 11 connected to an electrical contact member 12 movable between two stationary contact members 13 and 14 each connected to an electric control circuit 15, 16. The openings 8, 9 are so arranged as always to be simultaneously opposite projecting parts or recessed parts of the shaft 26.

The apparatus shown in the drawing is also provided with a third chamber or secondary duct 17 supplied with compressed air through a calibrated orifice 18 and having an outlet orifice 19 arranged in such a manner as to be simultaneously with the openings 8 and 9, opposite projecting parts and hollow parts respectively of the shaft 26. The chamber 17 is connected to a chamber 20 closed by a deformable diaphragm 21 forming an actuating member sensitive to the pressure obtaining in the chamber 20. The diaphragm 21 carries a metal disc 22 connected electrically to the contact 12 by a flexible blade 25 and a metal connection M. Finally, opposite the lower face of the disc 22 is located a stationary contact 23, connected electrically to one pole A of the two poles A, B of a source of electrical energy.

Springs 24 yieldably hold the disc 22 separated from the contact 23.

The operation of the apparatus described is as follows:

The clamp 10 is placed on the part 26 which is being machined, formed by a grooved shaft, in such a manner that the axis of rotation a of the shaft 26 is located on the straight line connecting the two orifices 8 and 9. The outlet orifice 19 of the control chamber is located opposite a portion of the surface of the grooved shaft corresponding with those located opposite the orifices 8 and 9. In a modified form of construction (not shown), the orifice 19 may be located to one side of the orifice 8 so as to open out opposite the same generating line of the shaft 26 as this orifice 8.

Under these conditions, when the shaft 26 turns in the interior of the clamp, the three orifices 8, 9 and 19 are always simultaneously opposite the projecting parts or the depressed parts of the shaft 26.

When the orifice 19 is opposite a projecting part, the pressure in the chamber 17 is so raised that the diaphragm 21 is held, by the pressure acting thereon and against the action of the springs 24, in a position in which the disc 22 while maintaining contact with the member n rests on the contact 23. The movable contact 12 is thus connected to the terminal A through the body of the apparatus, blade 25, member n, disc 22, and contact 23, and the movements of the diaphragm 11 cause one of the electric circuits 15 and 16 to be energized.

On the contrary, when the orifice 19 is opposite a depressed portion of the part 26, the pressure in the chamber 17 is low and the diaphragm 21 is repelled by the springs 24 up to a position in which the electrical connection is interrupted between the contact 23 and the blade 25. Under these conditions the contact 12 is no longer connected to the terminal A so that the movements of the diaphragm cannot cause the electric circuits 15 and 16 to be energized. It thus follows that the passage of the depressed parts opposite the orifices 8 and 9 remains without effect on the electric control or signalling circuits.

Thus at the start of machining the grooved shaft 26, its diameter is greater than the required diameter, so that on each passage of a projecting part, the diaphragm 11 is repelled upwardly by the pressure which is established in the chamber 3. Consequently on each passage of a projecting part, the contact 12, 13 is closed and the circuit 15 supplied with current. This circuit may be provided with a signalling lamp which is periodically placed into and out of circuit thereby producing intermittent flashes. These flashes indicate that the machining should be continued. Then as the diameter of the grooved shaft decreases, the pressure established in the chamber 3 during the passage of a projecting part, eventually becomes equal to that existing in the chamber 2. The diaphragm then remains in its mid position and none of the circuits 15 or 16 is supplied with current. As a result the signalling lamp no longer flashes, whereby the operator is made aware that the desired diameter will soon be reached. Finally, the diameter of the shaft 26 continues to diminish, the delivery through the openings 8 and 9 becomes sufficient for maintaining in the chamber 3 a pressure sufficiently weak so that the contact 12, 14 remains closed permanently and the control circuit 16 is energized each time that a projecting part passes in front of the orifice 19, thus provoking the closing of the contacts 22, 23, which connect the movable contact 12 electrically to the terminal A.

The circuit 16 is thus energized periodically. The latter may include a signalling lamp, for example, of which the flashes indicate to the operator that the diameter of the shaft 26 corresponds with that required.

By setting the member E, the operator can modify the delivery of air through the orifice 6. This setting determines at what point the circuit 16 will become energized effectively for the first time. The diameter of the shaft 26 will correspond with this setting. This adjustment may be effected easily be turning in the clamp 10 a shaft of which the machining has already been completed and of which the diameter corresponds with that desired for another shaft.

From the above description and the accompanying drawing it will be seen readily that the apparatus described permits the continuous and automatic calibration during the course of the machining operation.

It is advantageous to provide the chambers 2, 3 and 17 of a volume as small as possible, in order to obtain an apparatus which reacts very rapidly and which is capable of effectively measuring the diameter during the short period of time of the passage of a projection in front of the openings 8 and 9. In the form of construction of Fig. 2, the apparatus is further provided with a second regulating chamber 30 supplied with compressed air through a calibrated orifice 31 and provided with an outlet orifice 32 of which the cross sectional passage area may be adjusted by means of an adjusting member R'. The chamber 30 and the chamber 17 are connected to a differential pressure indicating device C of the same type as D located between the chambers 2 and 3, and which is provided with a movable contact 22 actuated by a diaphragm and two stationary contacts 23 and 24. Thus in this second form of construction, the apparatus is provided with two pneumatic Wheatstone bridges, one for measuring which is provided with the chambers 2 and 3 connected to the differential pressure indicating device D, the other for control which is provided with the chambers 17 and 30 connected to the differential pressure indicating device C.

Figure 2:
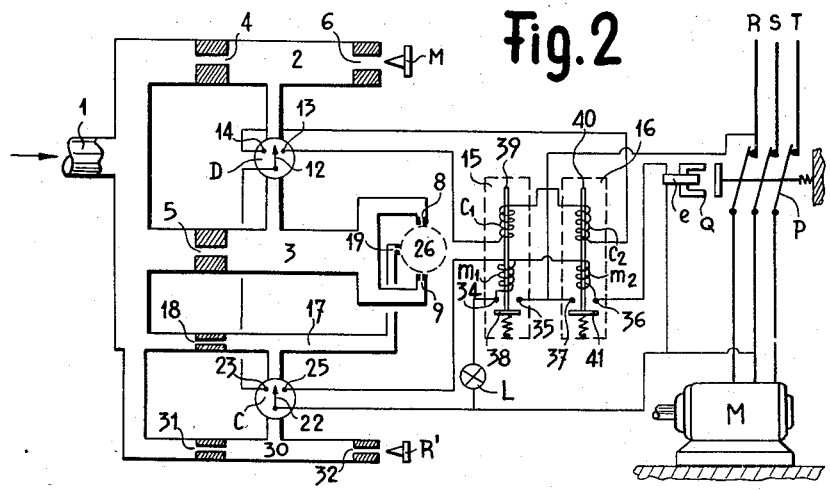
Fig. 2 is a diagram of a second form of construction.

In the form of construction according to Fig. 2, the control circuits 15 and 16 are each provided with an electromagnetic relay of which the movable elements 39, 40 control the opening and closing, respectively, of the contacts 34, 35 and 36, 37. Each relay is provided with two exciting windings $c_1$, $c_2$ and $m_1$, $m_2$. The windings $c_1$ and $c_2$ are measuring windings and are connected respectively to the contacts 13 and 14 of the indicating device D, while the windings $m_1$ and $m_2$ are holding windings the upper ends of which are mutually connected to the contact 25 of the indicating device C, and the other ends are connected to the contacts 34 and 36, respectively. The contacts 35 and 37, are connected to the phase R of a supply network. Finally, a signalling lamp L is inserted between the contact 34 and a phase S of the network. Between the phase S and the contact 36 there is inserted an exciting winding e of a control electromagnet Q producing the disengagement of a main switch P connecting to the mains RST a motor M which drives the machine tool.

The operation of this electric control device is as follows:

At the commencement of machining the grooved shaft 26, at each passage of a projecting part in front of the orifice 19, the movable contact 12 is placed in circuit with the phase S by engagement of the stationary contact 23 with the movable contact 22 controlled by the flexible diaphragm of the indicating device C. As long as the diameter of the shaft is too large, the pressure which is established in the chamber 3, during the passage of the projections in front of the orifices 8 and 9, results in a closing of the contacts 12, 13 and thus the feeding of the measuring winding $c_1$ of the relay 15. Consequently the movable element 39, carrying a movable contact 38, is attracted against the action of its spring thus connecting the contacts 34, 35, with consequent excitation of the signalling lamp L.

When the projecting parts move away from the orifices 8, 9 and 19, the pressure in the chamber decreases and the contacts 12, 13 separate from each other, thereby interrupting the supply of current to the winding $c_1$. However, the pressure in the chamber also decreases and the contact 22 comes to bear against the contact 25 so that approximately at the instant at which the supply of current to the measuring winding $c_1$ is interrupted, the holding winding $m_1$ is energized through S, 22, 25, $m_1$, 34, 55, R. It is, in fact, easy to adjust the delivery of the opening 32 by operating the member R, in such a manner that during the entire machining operation of the shaft 26 the contacts 22, 23 will be closed when the orifice 19 is opposite a projection of this shaft 26, and the contacts 22, 25 will be closed when the orifice 19 is opposite a groove of the shaft 26.

Thus the signalling lamp is continuously energized, the windings $c_1$ and $m_1$ being alternately placed into and out of circuit from the beginning of the machining operation until the moment at which the pressure developed in the chamber 3 by the passage of the projecting parts of the shaft 26 in front of the measuring orifices 8 and 9, is no longer sufficient for causing the closure of contacts 12, 13.

In fact, if these contacts 12, 13 remain open during the passage of the projecting parts in front of the openings 8 and 9, the circuits of the windings $c_1$ and $m_1$ are broken simultaneously at 12, 13 and 22, 25, so that the movable element 39 is returned by its spring and results in the opening of the contacts 34, 35 and thus the interruption of the supply circuit of the lamp L. The extinction of the lamp L indicates to the operator that machining will soon be ended. Then, when the pressure developed in the chamber 3 by the passage of the projecting parts in front of the openings 8 and 9, is insufficient to separate the contacts 12, 14, the measuring winding $c_2$ is energized by S, 22, 23, 12, 14, R. The movable element 40 of the relay 16, carrying the movable contact 41, is attracted against the action of its spring and effects the closing of the contacts 36, 37 and the energizing of the winding $e$ of the electromagnet Q controlling the disengagement of the main switch P. It will be understood that the short lapse of time during which the winding $e$ is placed under voltage by the sole action of the pressure in the chamber 3 during the passage of the projecting parts in front of the orifices 8 and 9, is sufficient to produce the actuation of the control electromagnet Q. It is for this reason that the relay 16 is provided with the holding winding $m_2$ which is energized when the contacts 22, 25 and 36, 37 are closed simultaneously. This condition is fulfilled when the diameter of the shaft has reached the desired dimension, the measuring winding $c_2$ being temporarily energized for the duration of the passage of its projecting parts in front of the orifices 8, 9. When these projecting parts move away from these orifices, a groove comes opposite the orifice 19 and produces the closing of the contacts 22, 25 before the electrical connection between the contacts 36, 37 is interrupted. In practice, this result is obtained very easily by reason of the delay which occurs in the movements of a movable element of an electromagnet relative to the switching out of the circuit of its exciting winding. Thus, when the measuring winding $c_2$ has been initially energized, the movable element 40 is held in its position of closing the contacts 36, 37 by reason of the fact that the windings $c_2$ and $m_2$ are alternately energized. Thus, the electromagnet Q is continuously energized and causes the opening of the main switch P which interrupts, on the one hand, the supply of current to the motor M actuating the machine tool and, on the other hand, the supply of current to the movable contact 22 of the indicating device C and therefore of all the control and signalling circuits.

From the foregoing it will be apparent that very great technical advantages are derived from the use of an apparatus according to Fig. 2 as compared to all previously known apparatus of this type. In fact, the machining operation is supervised and controlled in a continuous and automatic manner, and moreover the machining operation is stopped automatically when the work piece reaches the required dimension.

It will be understood that the control and signalling circuits and the relays 15 and 16 may be adapted to all requirements imposed for each particular case, the apparatus according to Fig. 2 being given solely by way of example and not in a limiting sense.

The apparatus described may be used for calibrating grooved shafts, shafts provided with one or more key ways, plates provided with grooves and other parts having discontinuous surfaces or for the calibration and the selection of a succession of parts. In the latter case the discontinuity between two successive parts does not result in any irregularities in the calibration and the automatic selection of the parts provided that the three orifices 8, 9 and 19 are always simultaneously opposite corresponding projecting parts or grooves or a discontinuity of surface.

I claim:

1. Pneumatic measuring apparatus for comparing the dimensions of an object against a fixed standard, comprising a body member, means providing two primary pneumatic ducts in said member; means for connecting said ducts to a common source of compressed air; one of said ducts, regarded as the measuring duct, being provided with at least one fixed outlet orifice adjacent to which the object to be measured is normally placed; the other duct, regarded as the adjusting duct, having an adjustable outlet orifice; each of said ducts being provided with a calibrated inlet orifice; a pneumatic differential pressure indicating device having a pair of chambers separated by a flexible pressure sensitive diaphragm; each chamber being pneumatically connected to one of the ducts at a point between the inlet orifice and the outlet orifice of the duct; said pressure indicating device including an electrical signaling circuit containing an electrical switch operated to its open and closed positions by the movement of said diaphragm; means providing a third pneumatic duct, regarded as a control duct, connected to said common source of compressed air and having a fixed outlet orifice for disposition adjacent the object to be measured; whereby pressure variations in the control and measuring ducts will occur simultaneously; said electrical signaling system including an electrical control switch having movable electrical contact elements; means pneumatically connected to said control duct and responsive to pneumatic pressure changes therein for moving said elements in and out of contact relation.

2. Pneumatic measuring apparatus for comparing the dimensions of an object against a fixed standard, comprising a body member, means providing two primary pneumatic ducts in said member; means for connecting said ducts to a common source of compressed air; one of said ducts, regarded as the measuring duct, being provided with at least one fixed outlet orifice adjacent to which the object to be measured is normally placed; the other duct, regarded as the adjusting duct, having an adjustable outlet orifice; each of said ducts being provided with a calibrated inlet orifice; a pneumatic differential pressure indicating device having a pair of chambers separated by a flexible pressure sensitive diaphragm; each chamber being pneumatically connected to one of the ducts at a point between the inlet orifice and the outlet orifice of the duct; said pressure indicating device including an electrical signaling circuit containing an electrical switch operated to its open and closed positions by the movement of said diaphragm; means providing a pair of secondary ducts, regarded as control ducts, means for connecting said ducts to a common source of compressed air, each control duct having a calibrated inlet orifice; one of said control ducts having a fixed outlet orifice for disposition adjacent the object to be measured; whereby movement of the object to be measured relative to said fixed outlet orifices will cause pressure variations simultaneously in their corresponding ducts; the other secondary control duct having an adjustable outlet orifice; a pneumatic electrical control switch having a pair of chambers separated by a flexible pressure sensitive diaphragm, each chamber of the switch being pneumatically connected to one of the control ducts at a point between the inlet orifice and the outlet orifice thereof; said control switch having contact members and means for moving them to their open and closed positions by said last mentioned diaphragm.

ANDRÉ LOUIS AIMÉ FORTIER.

References Cited in the file of this patent

UNITED STATES PATENTS

| Number | Name | Date |
|---|---|---|
| 1,971,271 | Mennesson | Aug. 21, 1934 |
| 2,263,335 | Heinz | Nov. 18, 1941 |
| 2,295,399 | Hanna | Sept. 8, 1942 |
| 2,390,252 | Hayward | Dec. 4, 1945 |
| 2,448,653 | Aller | Sept. 7, 1948 |
| 2,516,932 | Wainwright | Aug. 1, 1950 |
| 2,571,557 | Fortier | Oct. 16, 1951 |
| 2,589,251 | Heinz | Mar. 18, 1952 |

FOREIGN PATENTS

| Number | Country | Date |
|---|---|---|
| 388,265 | Great Britain | Feb. 23, 1933 |